Sept. 2, 1969   T. F. McGRAW ET AL   3,464,122
LATITUDE-LONGITUDE COMPUTER

Filed Jan. 20, 1967   2 Sheets-Sheet 1

INVENTORS.
THOMAS F. McGRAW,
RICHARD R. FRANK
BY
Arsen Tashjian
ATTORNEYS

United States Patent Office 3,464,122
Patented Sept. 2, 1969

3,464,122
LATITUDE-LONGITUDE COMPUTER
Thomas F. McGraw, Sunnyvale, Calif., and Richard R. Frank, Panama City, Fla., assignors to the United States of America as represented by the Secretary of the Air Force
Filed Jan. 20, 1967, Ser. No. 610,699
Int. Cl. G09c 5/00
U.S. Cl. 35—2                    3 Claims

ABSTRACT OF THE DISCLOSURE

A computing device having three discs independently rotatable around a common central pivot point, the two outer discs being provided with spirally disposed openings through which figures graphically depicted on the center disc can be observed to make determinations of latitude and longitude positions on the earth's surface based on information received in codified form.

---

The invention described herein may be manufactured and used by or for the United States Government for govermental purposes without payment to us of any royalty thereon.

This invention relates to a computing device and more particularly to an improved computer for determining actual latitude and longitude earth positions based on coded data received in the form of letters and digits.

Presently, one of the methods of transmitting geographic information such as latitude and longitude readings is by the use of a series of letters and digits. A system which utilizes this method is known as Georef and the information transmitted is called Georef code. A point on the globe presented in this code is given by four letters followed by four digits, as for example, "GJEA 2505." Heretofore, it was necessary to use conversion tables to transform the coded information into a form usable to determine the corresponding geographic point on the globe. This procedure involves the choice of proper latitude-longitude readings from a multi-columned conversion table, which many times leads to the possibility of misreading one or more of the values. Also, a relatively large number of errors are made by comparatively untrained personnel, particularly when rapid decoding of transmitted information is required.

The present invention utilizes a single device and requires only two movements to convert Georef coded information into latitude-longitude readings and vice versa. This arrangement practically eliminates the chance of error and allows extremely rapid determination of the correct readings. It is only necessary to rotate each of two discs relative to a center disc and to read the figures which appear in the proper windows in the rotated discs. This leaves little or no chance for human error and permits conversion of the coded information rapidly and with a minimum of eye movement, thereby reducing the possibility of misreading errors caused by carelessness or fatigue of the operator.

Accordingly, it is an object of the present invention to provide means for converting information sent in coded form into data which can be used to indicate a geographic point in the earth's surface.

Another object of the invention is to provide a device which will eliminate the need for decoding Georef information by scanning through multi-columned tables leading to errors caused by misreading and fatigue of the personnel performing the decoding operation.

Still another object of the invention is to provide an efficient decoding system which is simple to use by relatively untrained personnel and which requires only a minimum of movements to accurately decode the information received or to convert uncoded information into a form for transmittal by a code system such as Georef.

A still further object of the invention is to provide a device which is simple and easy to construct in large quantities for general use to encode and decode geographical information and which reduces the chance of error while at the same time permits more rapid and accurate determination of the necessary information.

These and other objects, features and advantages will become more apparent after considering the following detailed description taken in conjunction with the annexed drawings and appended claims.

In the drawings wherein like reference characters refer to the like parts in the several views.

Figure 1:
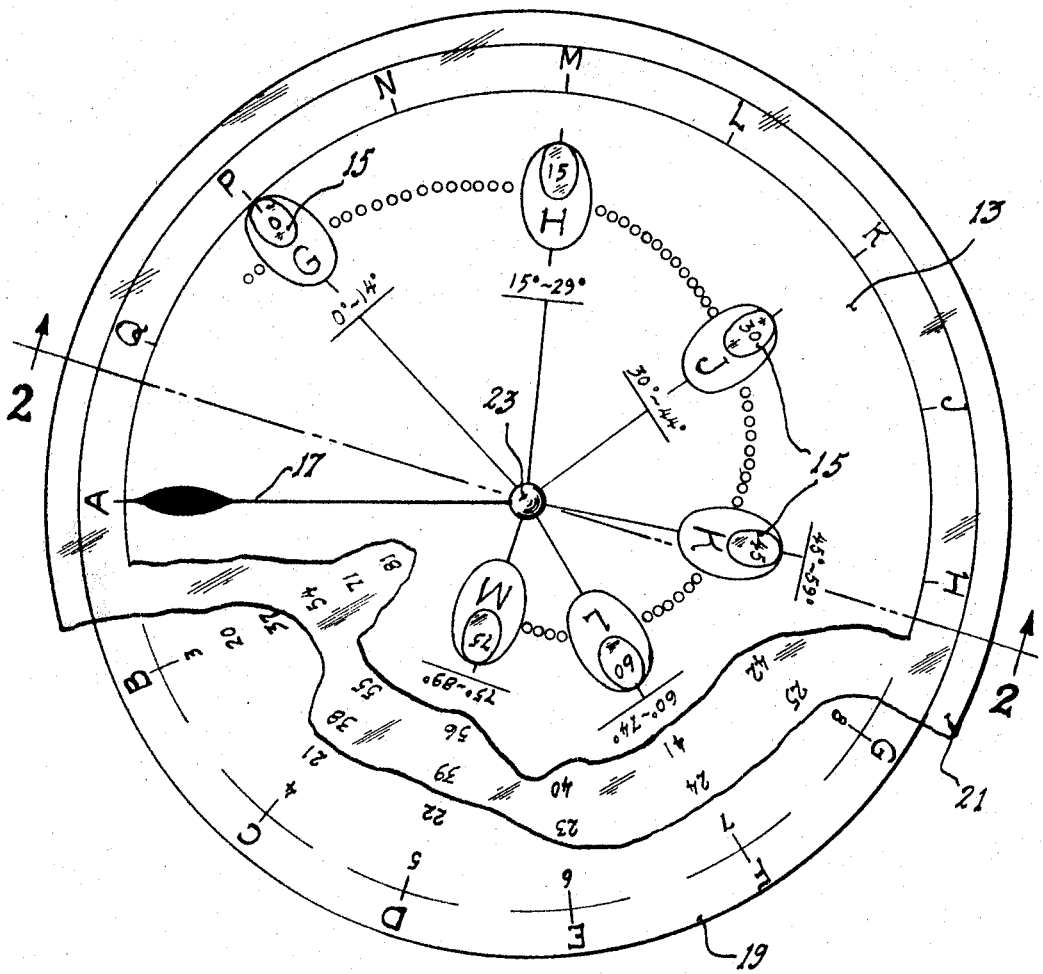
FIGURE 1 is a top plan view partially broken away showing the arrangement of the elements when the computer is used to make latitude determinations from coded information.
Figure 3:
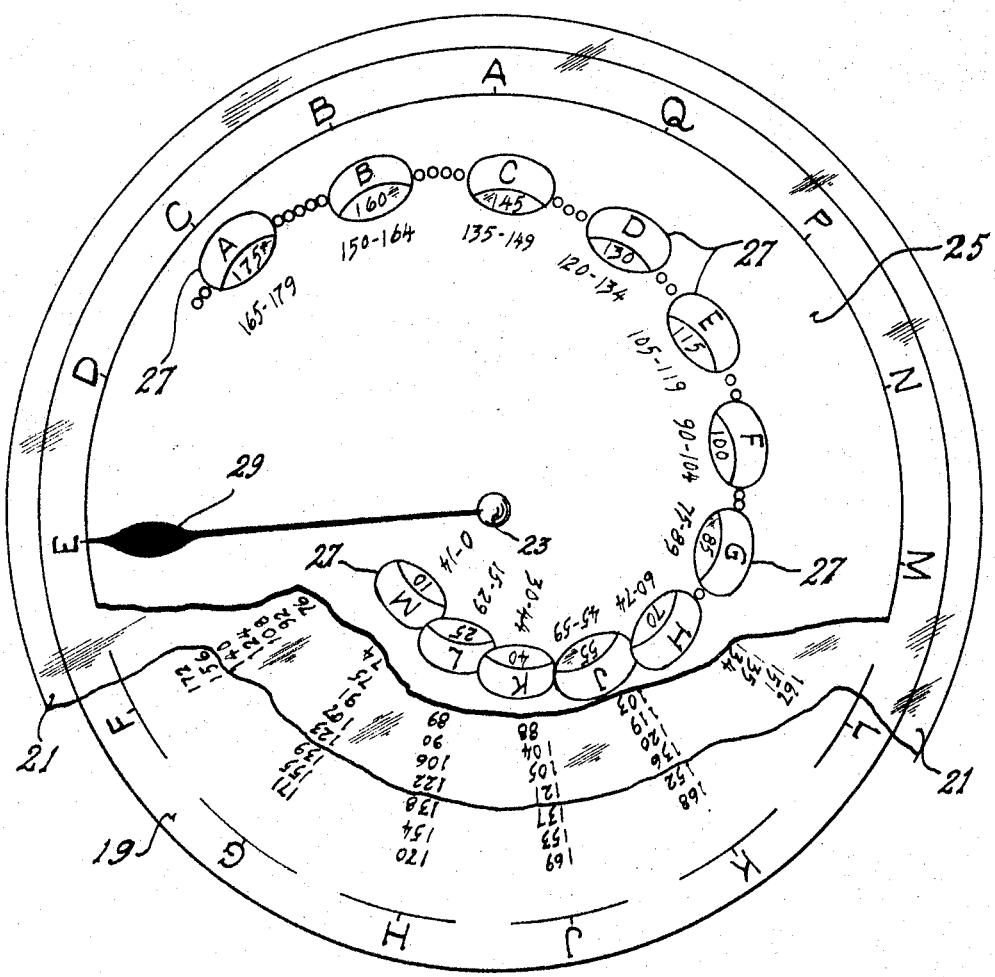
FIGURE 3 is a top plan view partially broken away showing a computer according to the invention for use to decode longitude information sent by Georef code.

Referring now to the drawings, there is shown in FIGURES 1 and 3 a preferred embodiment of the latitude-longitude computer according to the invention. The computer includes a flat latitude disc 13 constructed of cardboard, plastic, metal or the like, having a series of six spirally disposed elliptical openings 15 therethrough. Each of the openings 15 are labelled a particular letter which identifies with a corresponding letter of a code transmittal system such as Georef. In the embodiment shown, the six openings 15 are located on radially extending lines 49 degrees apart and are positioned at progressively increasing distances from the center of the disc 13. A reference pointer 17 is positioned along a radial line of the disc 13, 48 degrees from the outermost of openings 15 and 72 degrees from the innermost of the spirally disposed openings 15.

The pointer 17 which is marked on the disc 13 is placed in alignment with one of a series of letters placed at 24 degree intervals on the outer edge of one side of a central disc 19. Each of the series of letters has a corresponding column of numbers radially disposed on the central disc 19 such that one number is visible through each of the openings 15 in the latitude disc 13 when the pointer 17 is in alignment with one of the letters on the outer edge of the central disc 19. These numbers represent the latitude reading in degrees based on the coded information transmitted by the Georef system when the discs are properly positioned with respect to one another. The central disc 19 is preferably covered on both sides and sealed with clear plastic sheets 21 so as to provide protection and prevent wearing of the surface during operation of the computer.

Figure 2:
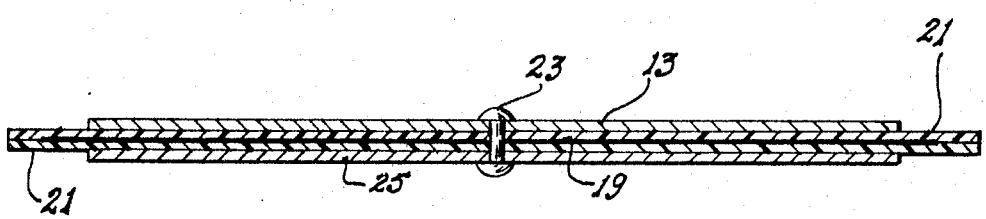
FIGURE 2 is a sectional view taken along the line 2—2 of FIGURE 1.

In FIGURE 2, there is shown a cross-sectional view of the computer. Any convenient device such as the rivet 23 may be employed to rotatably mount the discs so that each may be turned relative to the others. This arrangement permits the upper disc 13 in FIGURE 1 to be rotated to a desired position so that the pointer 17 is in alignment with the correct letter imprinted on the outer edge of the central disc 19 or in a position so that a proper latitude reading is visible through one of the openings 15. Each of the openings 15 covers a range of 15 degrees of latitude in order to provide readings suitable for use in conjunction with locations in the particular hemisphere under consideration.

In the determination of longitude directions, the other side of the central disc 19 is imprinted with a column of radially disposed figures every 24 degrees as shown in FIGURE 3. A flat longitude disc 25 constructed of cardboard, plastic, metal or the like is provided with a series of twelve spirally disposed elliptical openings 27 through which the radial columns of figures can be viewed. An identifying letter is provided for each of the openings 27. The Georef code transmittal system includes corresponding letters which identify with the properly labelled openings 27. As shown in FIGURE 3, the openings 27 in the longitude disc 25 are twelve in number and are spaced at 24 degree intervals to match the radially disposed figure columns on the longitude side of the central disc 19. A reference pointer 29 is marked on the longitude disc 25 along a radius line midway between or 48 degrees from both the innermost and the outermost of the spirally disposed openings 27. The procedure for decoding and encoding the available data is the same as that hereinbefore described in reference to the latitude disc 13. That is, the longitude disc 25 and the central disc 19 are positioned in a specific relationship to one another depending on the coded data received and the numbers visible through the openings 27 indicate the longitude readings of earth position corresponding to the Georef code message.

Example of operation

By way of example of operation of the embodiment shown in FIGURE 1 in the drawings, to determine the latitude reading of an earth location in a particular earth quadrant such as that covered by NORAD, assume that a coded message given by four letters followed by four digits is transmitted by teletype to a central area. The coded message thus received is called the Georef code and, for example, may be represented as "GJEA 2505." This information may be used to plot a point on the globe where some event such as a nuclear detonation or disaster has occurred.

The latitude of the point GJEA 2505 can be quickly determined by using the present invention by first setting the pointer 17 on the latitude disc 13 next to the letter A on the central disc 19, this being the fourth letter of the code, and then reading the figure which is visible through the opening 15 identified by the letter J, the second letter of the code message. This procedure shows the latitude to be 30 degrees. The last two digits of the Georef code directly indicate the minutes of latitude, which in the cited example would be 05. Therefore the latitude of the point GJEA 2505 would be 30 degrees 5 minutes.

To find the longitude reading for the sample coded information, a similar procedure to that described above is carried out. The pointer 29 on the longitude disc 25 in FIGURE 3 is set next to the letter E on the outer rim of the central disc 19. This letter is the third letter of the coded information. The elliptical opening 27 marked with the letter G, the first letter of the code, is in register with the figure 85 and and allows the figure to be seen therethrough. This latter figure is the longitude reading of the sample code. The first two digits, 25, of the Georef code are subtracted from 60 to obtain the minutes of longitude. Thus, the complete longitude reading would be 60 minus 25, or 35 degrees, and the actual position on the earth's surface which corresponds to the Georef code GJEA 2505 is 85 degrees 35 minutes longitude and 30 degrees 5 minutes latitude. In the described example, the figures are in reference to the earth quadrant in which North America is located.

To encode actual latitude-longitude readings into a form compatible for transmission by Georef code, the above-described procedure is carried out in reverse. That is, the degree and minutes latitude/longitude readings are quickly changed by the computer into the four letter followed by four digit Georef code. The information can then be transmitted to control areas where it can be decoded by the computer and put to use by personnel such as Disaster Control Units. The speed and reliablility of the information thus transmitted and received is greatly improved by using the herein described latitude-longitude computer.

Although the invention has been illustrated and described in terms of a preferred embodiment thereof, it will be apparent to those skilled in the art that certain changes, alterations, modifications and substitutions, particularly with respect to the construction details, can be made in the arrangement and location of the various elements without departing from the true spirit and scope of the appended claims. For example, the computer may be fabricated as two separate devices of two relatively rotatable discs each. One would be adapted for decoding and encoding latitude data and the other for longitude data.

Having thus set forth and disclosed the nature of our invention, what we claim is:

1. A computing device for decoding transmitted geographic information comprising, a first circular disc concentrically mounted for rotatable movement around a central pivot point, said first disc being provided with a series of spaced elliptical openings circumferentially disposed at progressively increasing distances from the central point in a spiral relationship, each of said openings being identified with a letter, a reference pointer marked on the face of said first disc pointing toward the outer edge thereof, said reference pointer being positioned along a radius line forty-eight degrees counterclockwise from the outermost of the elliptical openings, a central disc concentrically mounted for rotatable movement around a central pivot point, said central disc being larger in diameter than said first circular disc and imprinted with a series of letters near the outer periphery on the upper surface thereof, a series of figures in radially disposed columns at twenty-four degree intervals imprinted on said central disc, one column of figures corresponding to and in alignment with each of the leters on said central disc, the alignment of said reference pointer on said first disc with one of the letters on said central disc serving to expose one figure in each of the radially disposed columns on said central disc in register with the spirally disposed elliptical openings in said first disc, said exposed figures graphically representing earth positions corresponding to the identifying letters on said elliptical openings and the letters on the outer periphery of said central disc.

2. The computing device for decoding transmitted geographic information defined in claim 1 wherein the letter markings on the outer periphery of said central disc and the identifying letter markings on the spirally disposed elliptical openings in said first circular disc are representative of latitude readings in codified form and the radially disposed columns of figures imprinted on said central disc are actual earth latitude positions, and the reference pointer positioned on a radius line is spaced seventy-two degrees clockwise from the innermost of the elliptical openings, said elliptical openings being six in number and spaced at forty-eight degree counterclockwise intervals on said first disc.

3. The computing device for decoding transmitted geographic information defined in claim 1 wherein the letter markings on the outer periphery of said central disc and the identifying letter markings on the spirally disposed elliptical openings in said first circular disc are representative of longitude readings in codified form and the radially disposed columns of figures imprinted on said central disc are actual earth longitude positions, and the reference pointer positioned on a radius line is spaced forty-eight degrees clockwise from the innermost of the elliptical openings, said elliptical openings being twelve in number and spaced at twenty-four degree counterclockwise intervals on said first disc,

References Cited

UNITED STATES PATENTS 2,940,665  6/1960  Hitch et al _____ 35—3

FOREIGN PATENTS 86,043  8/1957  Netherlands.

EUGENE R. CAPOZIO, Primary Examiner

W. W. NIELSEN, Assistant Examiner